United States Patent
Tal

(10) Patent No.: US 10,076,715 B2
(45) Date of Patent: Sep. 18, 2018

(54) FILTER CLEANING METHOD

(75) Inventor: Ron Tal, Shamir (IL)

(73) Assignee: BALLASTMARINE Ltd., Herzliya (IL)

( * ) Notice: Subject to any disclaimer, the term of this patent is extended or adjusted under 35 U.S.C. 154(b) by 1191 days.

(21) Appl. No.: 13/699,015

(22) PCT Filed: May 19, 2011

(86) PCT No.: PCT/US2011/037082
§ 371 (c)(1),
(2), (4) Date: Nov. 20, 2012

(87) PCT Pub. No.: WO2011/146676
PCT Pub. Date: Nov. 24, 2011

(65) Prior Publication Data
US 2013/0061890 A1   Mar. 14, 2013

Related U.S. Application Data

(60) Provisional application No. 61/346,479, filed on May 20, 2010.

(51) Int. Cl.
*B01D 25/38* (2006.01)
*B01D 29/64* (2006.01)
*B01D 29/68* (2006.01)

(52) U.S. Cl.
CPC ............ *B01D 29/643* (2013.01); *B01D 25/38* (2013.01); *B01D 29/6461* (2013.01); *B01D 29/6492* (2013.01); *B01D 29/686* (2013.01)

(58) Field of Classification Search
CPC ......... A47L 9/04; B01D 29/643; B01D 25/38; B01D 29/6461; B01D 29/6492; B01D 29/686
See application file for complete search history.

(56) References Cited

U.S. PATENT DOCUMENTS

| 7,182,273 B2 * | 2/2007 | Proulx, Jr. ............... 239/110 |
| 2003/0098273 A1 | 5/2003 | Benenson |
| 2010/0300991 A1 * | 12/2010 | Hampton et al. ......... 210/806 |

FOREIGN PATENT DOCUMENTS

| DE | 9106165 | 7/1991 |
| DE | 9319221 | 2/1994 |

(Continued)

OTHER PUBLICATIONS

PCT Search Report PCT/US2011/037082, dated Nov. 25, 2011.

*Primary Examiner* — Rita P Adhlakha
(74) *Attorney, Agent, or Firm* — Dekel Patent Ltd.; David Klein

(57) ABSTRACT

Apparatus for filter cleaning including a filter element surface (12) to be cleaned, and a cleaning head (10), characterized by a controller (16) operative to move the cleaning head (10) with respect to the filter element surface (12) in a spiral scanning trajectory in such a way that a relative path of the cleaning head (10) with respect to the filter element surface (12) results in a trajectory that fully, or partially covers the filter element surface (12) and is produced by moving the filter element surface (12) in any combination of the following motions: a) one or more circular or semi-circular motions, b) one or more linear motions; while moving the cleaning head (10) in any combination of the following motions: c) one or more circular or semi-circular motions, d) one or more linear motions.

5 Claims, 3 Drawing Sheets

(56) References Cited

FOREIGN PATENT DOCUMENTS

| | | |
|---|---:|---:|
| DE | 202006009112 | 8/2006 |
| EP | 0247445 | 12/1987 |
| FR | 2913348 | 9/2008 |
| NL | 8103750 | 3/1983 |
| WO | 2004/007051 | 1/2004 |
| WO | 2004/020071 | 3/2004 |

* cited by examiner

FILTER CLEANING METHOD

FIELD OF THE INVENTION

The presented invention relates to the field of automated and semi-automated filtration systems, such as but not limited to, water filters with automated cleaning processes.

BACKGROUND OF THE INVENTION

All filtration systems are tasked with purifying some medium by separation of some suspended particles from the medium. An automated filtration system is a system that can remove suspended particles from liquid or gas and when required, regenerate or clean itself using some automated cleaning process. A semi-automated filtration system is a version of an automated filtration system with manual cleaning initiation and/or a human powered cleaning process. Aside from the above mentioned difference, in most cases the cleaning mechanisms are identical for both semi-automatic and automatic filters. (The present invention applies to both automated and semi-automated filters.)

Filtration is most often achieved using a size-discriminating medium. The gas or liquid being filtered is forced through the discriminating medium. In the process, suspended solids larger than the pores in the medium are trapped on the surface of the medium and in the medium itself. Some of the most popular filtration media are screens, granular beds (often sand), tightly packed disks, and wound fiber. Automated and semi-automated filters are capable of regenerating (cleaning) their filtration media.

The filtration and cleaning process for most automated water filters is as follows:

Filtration—Physical separation of suspended solids from a filtration medium. The stage begins with a clean filtration medium. As filtration progresses there is an increased buildup of filtered mass (filtrate) on the filtration medium.

Sensing—As filtrate builds up on the filtration medium, the filter's hydraulic resistance increases. This increase can be sensed by measuring the pressure differential between the intake and the outlet of the filter. Often a controller (mechanical or electronic) can sense the degree of resistance and trigger a cleaning cycle.

Cleaning—Clean filtration media are gradually clogged with the filtered particles (filtrate). As a result, the medium's hydraulic resistance increases. As filtration continues so does the buildup of filtrate and hydraulic resistance. Eventually a hydraulic resistance is reached where the filtration process is no longer economical. Automated filters clean their filtration media using a separation method such as, but not limited to, reverse flow or high pressure water jet. During the process the method is applied locally to a small portion of the filtration media surface and is gradually moved in such a way as to eventually cover the entire medium surface. One of the main reasons for this trajectory based process is that it is not viable to apply the separation method to the entire surface at once. Thus, the art of automated and semi-automated filter cleaning consists of two vital elements:

1 The separation method—the method for removing the filtrate buildup on the filter medium, usually applied locally by means of a cleaning tip or head.

2 The scanning method—the method for generating a trajectory that produces an appropriate coverage of the entire filtration medium by the cleaning head with a given cleaning effectiveness radius.

The prior art in automated and semi-automated scanning methods consists mostly of helix type trajectories along a cylindrical surface. A cylindrical filtration medium, often made of woven screens, is usually cleaned using reverse flow through a nozzle. Such filters build a filtrate layer inside the cylindrical screen and are cleaned by moving a nozzle in a helical path along the surface of the cylinder. The nozzle is open to atmospheric pressure through a pipe and the pressure drop causes suction and the removal of the buildup on the screen. The helical path of the nozzle is achieved through the combined action of rotational and linear motion. Some filters coordinate the two motions very carefully using a screw to produce a very efficient cleaning process while others have no coordination at all. In all cases, the quality of the cleaning is influenced by the completeness of coverage and the "instantaneous contact time" (ICT), both a function of the trajectory. The coverage is determined by the path, while the ICT is determined by the speed of travel along the path.

All known prior art helix based scanning methods have severely limited ability to adjust the trajectory or none at all.

In the known prior art, there are no scanning methods for cleaning flat surfaces using combinations of two or more motions, nor are there scanning methods for cleaning cylindrical surfaces that combine two rotations or more, or any combinations of three linear and/or rotational motions.

SUMMARY OF THE INVENTION

The present invention seeks to provide an innovative scanning method for cleaning surfaces using spiral and spiral-like trajectories. The method is simple to generate and control and is suitable for all cleaning head types. It is particularly suitable to, but is not limited to, planar filter element surfaces, including but not limited to, waved or corrugated surfaces and any filter element surfaces with a large curvature radius that can be classified for all intents and purposes as planar or semi-planar. In contrast to the prior art, the present invention, as described herein below, is based on planar or semi-planar, spiral or spiral-like scanning trajectories that are produced by any combination of two or more circular and/or linear motions. The sub-class of spiral and spiral-like trajectories resulting from such combinations is used in the invention together with an effective cleaning radius—$R_E$—to produce a complete coverage of a filter element surface.

Though the following description focuses on water filtration it should be evident to the person skilled in the art of filtration that the invention applies to the cleaning of all filters regardless of the media being filtered.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figure 1:
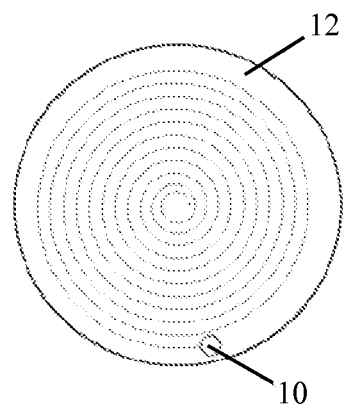
FIG. 1 illustrates spiral or spiral-like trajectories produced by combined rotational and/or linear motions that together with an effective cleaning radius "$R_E$" produce a complete coverage of a planar or semi-planar filter element surface, in accordance with an embodiment of the present invention.

Reference is now made to FIG. 1, which illustrates a cleaning head 10 used to clean a planar or semi-planar filter element surface 12, in accordance with an embodiment of the present invention. Cleaning head 10 has an effective cleaning radius $R_E$. Cleaning head 10 is moved in spiral or spiral-like trajectories produced by combined rotational and/or linear motions that together with the effective cleaning radius $R_E$ produce a complete coverage of filter element surface 12.

Figure 2:
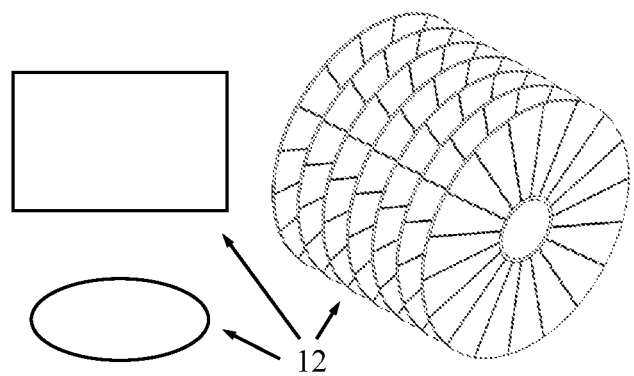
FIG. 2 illustrates that surfaces to be cleaned may have a circular, a semi circular (e.g., elliptic), or a polygon shaped perimeter, wherein the surfaces may or may not be stacked and can be made of segments, in accordance with an embodiment of the present invention.

Reference is now made to FIG. 2, which illustrates that surfaces 12 to be cleaned may have a circular, a semi-circular (e.g., elliptic), or a polygon shaped perimeter. The surfaces may or may not be stacked, and can be made of segments, in accordance with an embodiment of the present invention.

Figure 3:
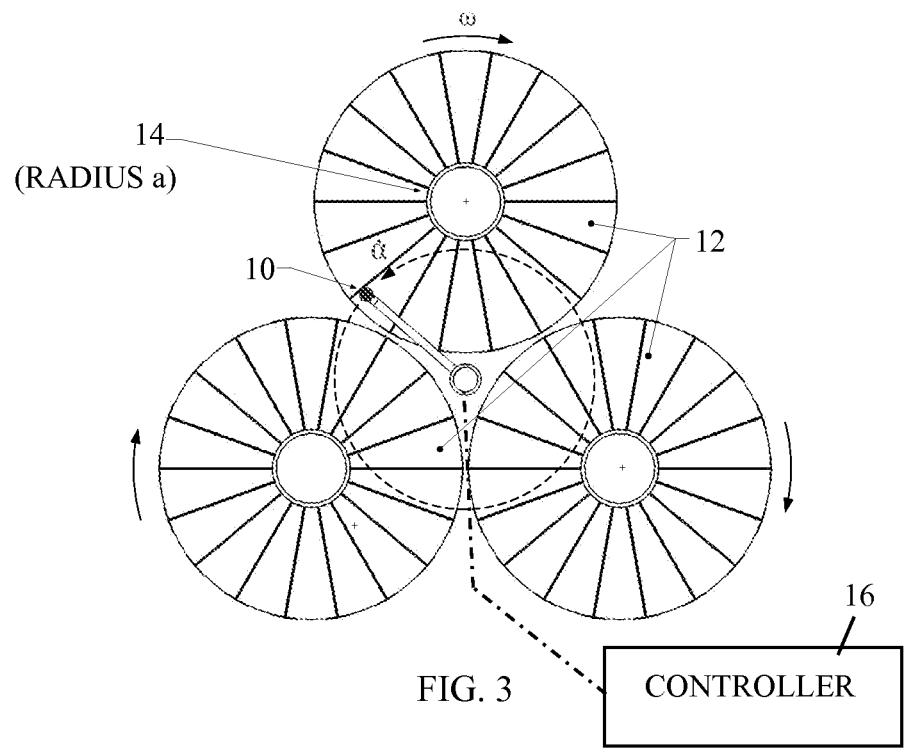
FIG. 3 illustrates surfaces distributed in a plane, each rotating with speed ω and cleaned sequentially using a single cleaning head rotating with speed $\dot{\alpha}$, in accordance with an embodiment of the present invention.

Reference is now made to FIG. 3, which illustrates cleaning multiple surfaces 12 distributed in a plane (the surfaces may be stacked). Each surface 12 rotates with speed ω and is cleaned sequentially using the single cleaning head 10, which rotates at a slower speed $\dot{\alpha}$. Each filter element surface 12 may have a dead space 14 of radius a that is not used for filtration (a may be zero). A controller (actuator) 16 uses the motion equations presented herein to control the motion of cleaning head 10 over filter element surfaces 12.

The governing equations for just two such example trajectories are presented below. The first example is for trajectories resulting from combining two rotational motions, and the second example is for trajectories resulting from combining a rotational motion with a linear motion.

For a trajectory governed by two circular motions we have:

If we fix the radius "R" of one Circular_Motion_1, then the radius "r" of Circular_Motion_2 is determined by the angle of rotation of Circular_Motion_1 as follows $$r_\alpha = \sqrt{a^2 + 2 \times (R^2 + R \times a) \times [1 - \cos(\alpha)]} \quad (1)$$

where
$r_\alpha$=Radius of Circular-Motion_2 as function of "α"
R=Constant radius of Circular-Motion_1
a=Radius of dead surface (area not cleaned, can also be zero).
α=Angle of rotation in Circular-Motion_1
$\dot{\alpha}$=Angular rotation velocity of Circular-Motion_1
(To avoid confusion, it is noted that the equation has cosine of angle alpha, and of course not cosine of radius a).

The spiral trajectory is traced by combining the two rotations (the spiral trajectory having a radius $r_θ$). In a polar coordinate system we can write:

$$r_θ = a + R_E \times θ \quad (2)$$

Where
ω=$\dot{θ}$=Angular rotation velocity of Circular-Motion_2
$R_E$=The effective cleaning radius of the cleaning head (the increment in "r" for each complete rotation in Circular-Motion_2).
a=Radius of dead surface (area not cleaned, can also be zero).

It should be noted that the ratio of rotation ω/$\dot{\alpha}$ determines the "tightness" of the spiral.

Figure 4:
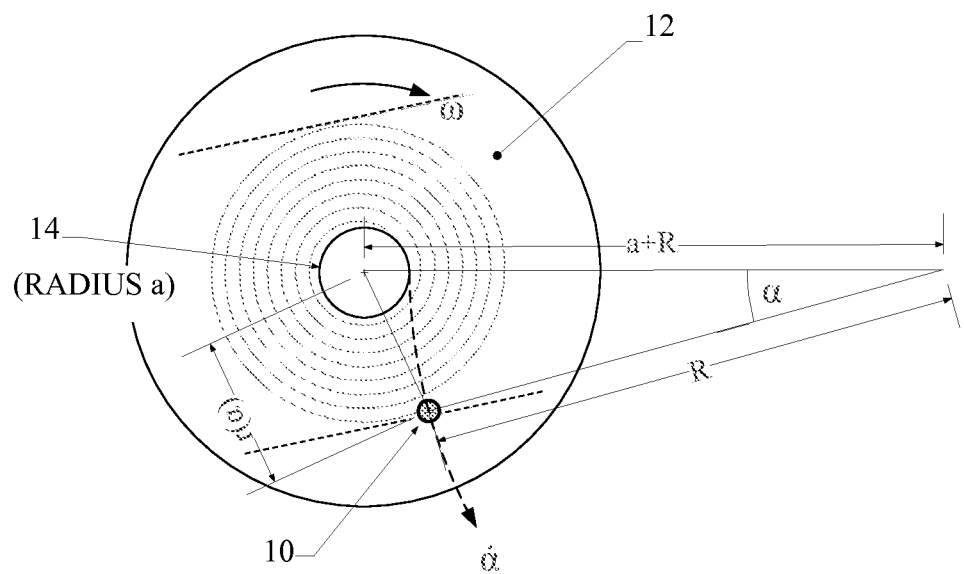
FIG. 4 illustrates the spiral-like trajectory generated by two combined rotational motions and the resulting complete coverage of a planar or semi-planar filter element surface, in accordance with an embodiment of the present invention.

Reference is now made to FIG. 4, which illustrates the spiral-like trajectory generated by two combined rotational motions and the resulting complete coverage of a planar or semi-planar filter element surface, in accordance with an embodiment of the present invention.

For a trajectory governed by a circular motion combined with a linear motion we have:

$$r_X = \sqrt{a^2 + X^2} \quad (3)$$

Where
$r_X$=Radius of the Circular-Motion as function of "X"
a=Radius of dead surface (area not used, can also be zero).
X=position along the linear path
Here also, the spiral trajectory is traced by combining the two motions. And the spiral equation is identical to equation (2).

Figure 5:
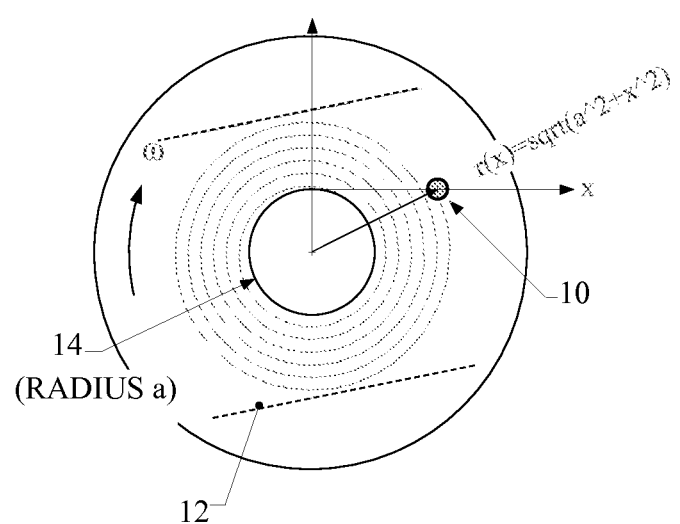
FIG. 5 illustrates the spiral-like trajectory generated by a rotation motion combined with a linear motion along X and the resulting complete coverage of a planar or semi-planar filter element surface, in accordance with an embodiment of the present invention.

Reference is now made to FIG. 5, which illustrates the spiral-like trajectory generated by a rotation motion combined with a linear motion along X and the resulting complete coverage of a planar or semi-planar filter element surface, in accordance with an embodiment of the present invention.

Though just two examples are given it should be clear to the person skilled in the art that any combination of two or more circular motions, two or more linear motions, and any combinations of one or more linear motion with one or more circular motions can also produce similar spiral or spiral-like trajectories. It should also be clear that the innovation is less concerned with the precision of coverage or its mathematics and is focused on the ease with which this class of planar and semi planar trajectories can be implemented in automated and semi-automated cleaning.

The advantages of these new automated scanning trajectories are:

1. The ability to clean round, planar and semi-planar filter element surfaces. This allows for filter designs that include, but are not limited to, batteries of stacked flat, round filter element surfaces (see FIG. 4).

2. Extremely simple actuation and controls compared with the existing state of the art. This makes for cheaper and more reliable systems.

3. Ability to dynamically change the trajectory by adjusting the path and the ICT independently. This enables better control during cleaning processes and provide for better and more efficient cleaning.

4. Compatible with any filtrate buildup separation method, including but not limited to, backwash through suction, high pressure liquid jet, and ultrasound cleaning heads. It is also compatible with most filter element surfaces, including but not limited to, screens, stacked disks, and wound fiber.

5. Can be used in cleaning any surfaces not just in the field of filtration.

It will be appreciated by persons skilled in the art that the present invention is not limited by what has been particularly shown and described hereinabove. Rather the scope of the present invention includes both combinations and any combinations subsets of the trajectories described hereinabove as well as modifications and variations thereof which would occur to a person of skill in the art upon reading the foregoing description and which are not in the prior art.

What is claimed is:

1. Apparatus for filter cleaning comprising:
   a filter element surface to be cleaned;
   a cleaning head; and
   a controller configured to move said cleaning head with respect to said filter element surface in a spiral scanning trajectory in accordance with the following equations:

$$r_\alpha = \sqrt{a^2 + 2 \times (R^2 + R \times \alpha) \times [1 - \cos(\alpha)]} \quad (1)$$

where
$r_\alpha$=Radius of Circular-Motion_2 as function of "$\alpha$"
R=Constant radius of Circular-Motion_1
a=Radius of dead surface
$\alpha$=Angle of rotation in Circular-Motion_1
$\dot{\alpha}$=Angular rotation velocity of Circular-Motion_1
and said spiral trajectory has a radius $r_\theta$ defined as:

$$r_\theta = a + R_E \times \theta \quad (2)$$

Where
$\omega = \dot{\theta}$=Angular rotation velocity of Circular-Motion_2
$R_E$=effective cleaning radius of said cleaning head
a=Radius of dead surface.

2. The apparatus according to claim 1, wherein said filter element surface comprises a stack of a plurality of filter element surfaces.

3. The apparatus according to claim 1, wherein said filter element surface comprises a plurality of filter element surfaces all lying in a common plane.

4. The apparatus according to claim 1, wherein said filter element surface rotates with speed w and said cleaning head rotates at a slower speed $\dot{\alpha}$.

5. The apparatus according to claim 1, wherein said filter element surface comprises a dead space of radius a that is not used for filtration.

* * * * *